May 31, 1966 M. J. H. STAAR 3,254,245
STEPPING MOTOR

Filed March 22, 1962 7 Sheets-Sheet 1

INVENTOR.
MARCEL JULES HELENE STAAR
BY
Wolfe, Hubbard, Voit & Osann
Attys.

May 31, 1966  M. J. H. STAAR  3,254,245
STEPPING MOTOR
Filed March 22, 1962  7 Sheets-Sheet 2

INVENTOR.
MARCEL JULES HELENE STAAR
BY
Wolfe, Hubbard, Voit & Osann
Attys.

INVENTOR.
MARCEL JULES HELENE STAAR

May 31, 1966 M. J. H. STAAR 3,254,245
STEPPING MOTOR
Filed March 22, 1962 7 Sheets-Sheet 4
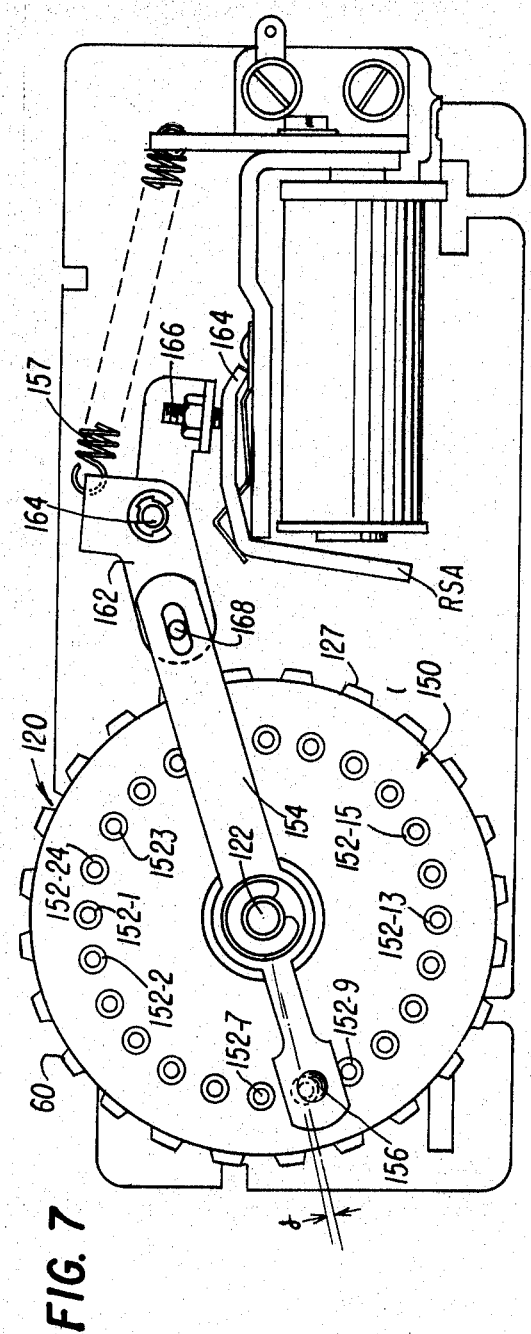
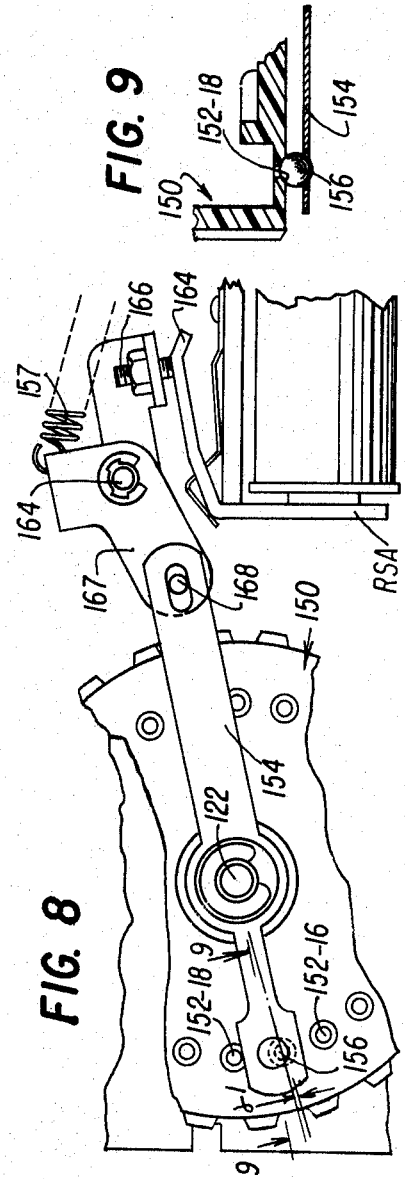
INVENTOR.
MARCEL JULES HELENE STAAR
BY
Wolfe, Hubbard, Voit & Osann
ATTYS.

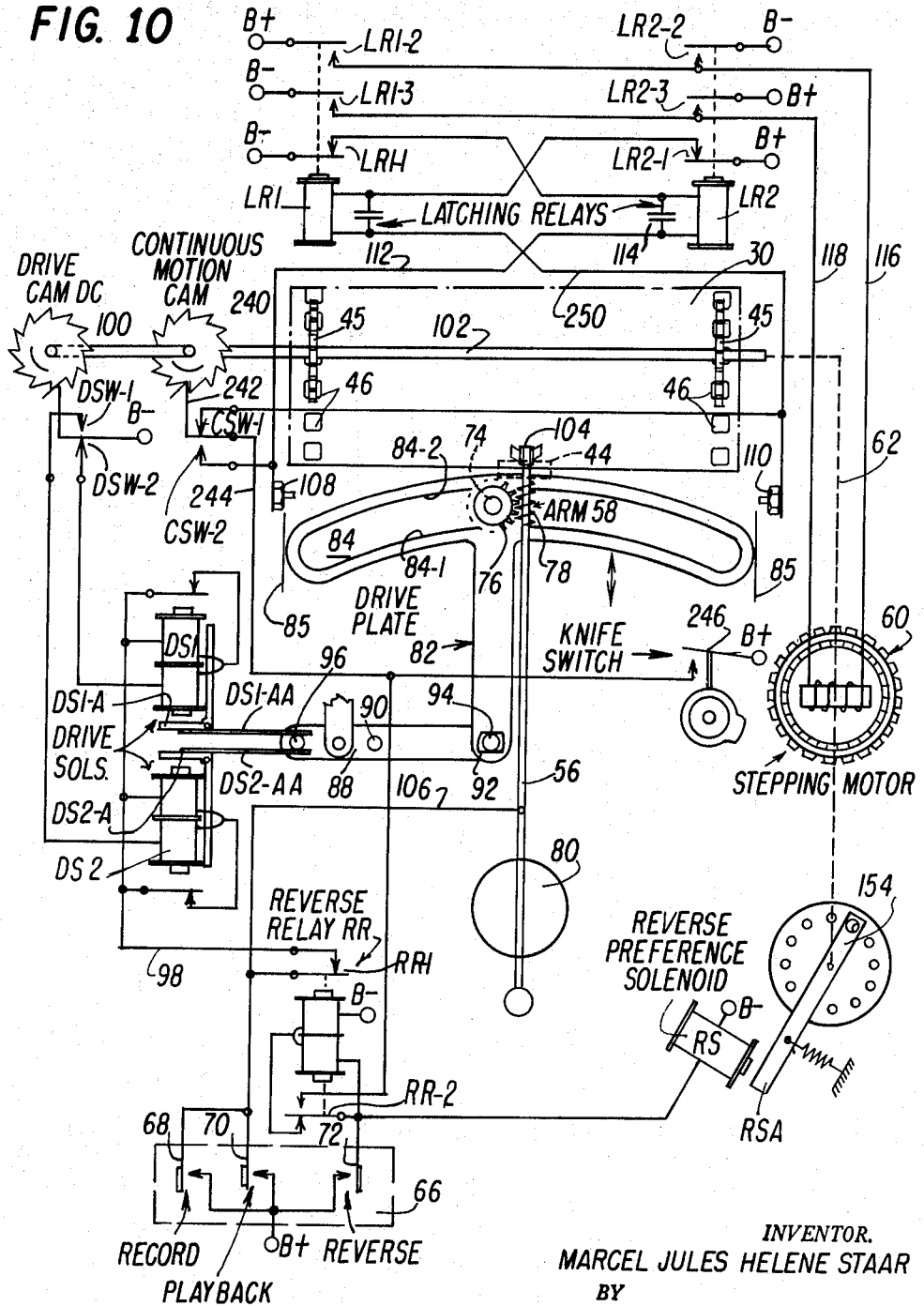

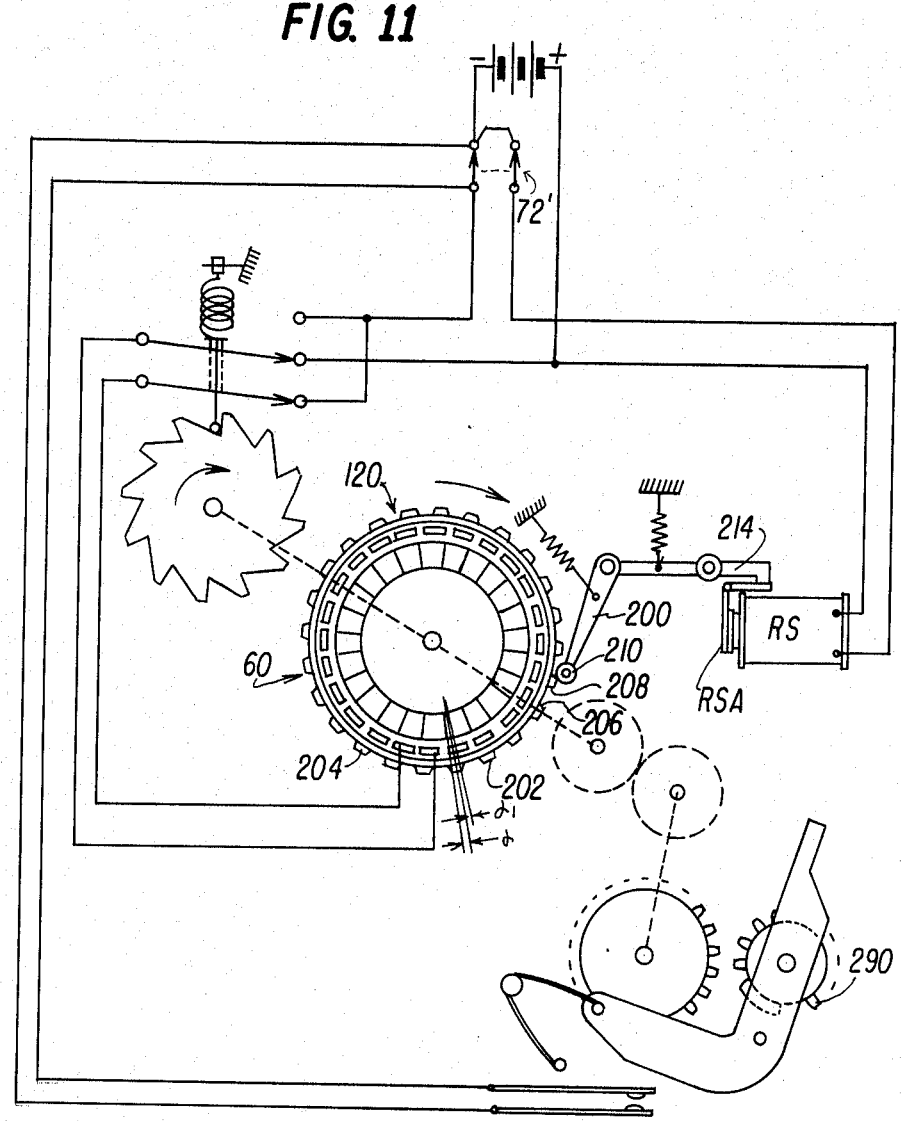

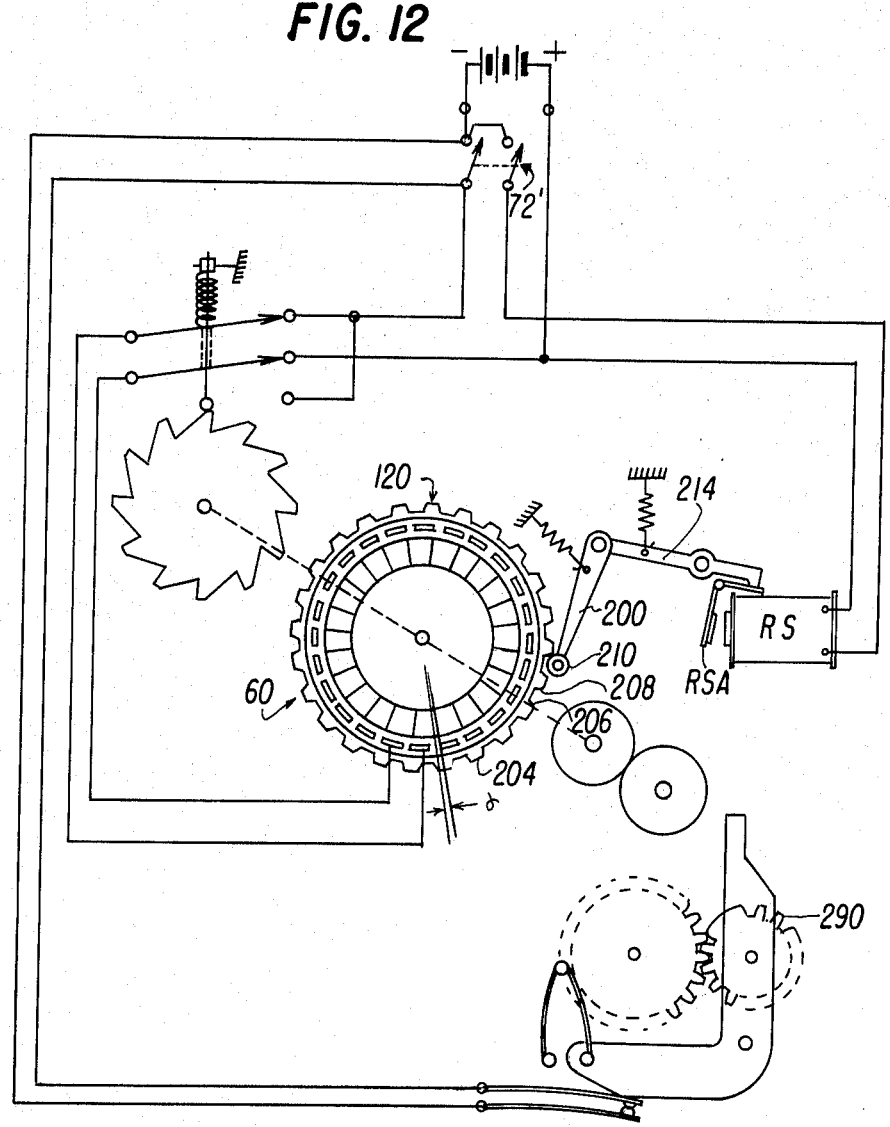

United States Patent Office 3,254,245
Patented May 31, 1966

3,254,245
STEPPING MOTOR
Marcel Jules Helene Staar, Brussels, Belgium, assignor to Usines Gustave Staar, S.A., Brussels, Belgium, a corporation of Belgium
Filed Mar. 22, 1962, Ser. No. 181,544
Claims priority, application Belgium, July 28, 1961, 606,675
5 Claims. (Cl. 310—49)

This invention relates to apparatus for sound recording and playback, and more particularly to tape drive mechanisms for dictating machines and the like of the type described in the copending application of Marcel Jules Helene Staar, Serial No. 181,543, entitled: Dictating Machine Drive Mechanism, filed March 22, 1962, now Patent No. 3,124,360. In such machines a relatively wide band of magnetic tape is used for the recording medium and the recording is in the form of longitudinally spaced transverse traces across the tape.

One object of the invention is to provide a tape drive mechanism adapted for operation in synchronism with reciprocation of the recording and playback head of such machine and capable of simultaneously advancing the tape precisely and silently the same distance each step to insure that the synchronism between head and tape is continuously maintained.

Another object is to provide a tape drive mechanism capable of rapid advancing motion to move the tape quickly so that a minimum interruption is present in the transverse movement of the recording and playback head as each trace is reversed to prevent audible reflections thereof in the recording.

A further object is to provide a tape drive mechanism selectively operable to obtain continuous tape stepping.

Another object is to provide a tape drive mechanism which is reversible, so that the tape can be moved continuously in either direction.

A further object is to provide a tape drive mechanism which is susceptible to manual operation, enabling movement of the tape manually in either direction, and without damage to the drive for the recording head or to the drive for the tape.

A further object is to provide a stepping motor device for such a tape drive or the like which is of simplified, compact and light construction, having relatively few moving parts, requiring low values of current to operate and self-starting and self-locking each step.

Other objects and advantages will become apparent as the following description proceeds, taken in connection with the accompanying drawings, wherein:

FIGS. 3A and 3B show successive positions of advance of a drive sprocket for the tape;

FIG. 7 is an enlarged view in side elevation of the preference means and the stepping motor device also shown in FIG. 1;

FIG. 8 is a view like FIG. 7 with the preference means in reverse position;

FIG. 9 is an enlarged fragmentary sectional view to show details of the preference arm and is taken in the plane of lines 9—9 in FIG. 8;

FIG. 10 is a diagrammatic view of the tape drive mechanism, recording and playback device, and control means therefor, of the dictating machine of FIG. 1;

FIG. 11 is a diagrammatic view of an alternative form of preference means for the stepping motor and control therefor;

FIG. 12 is a view like FIG. 11, showing the preference means in advance position and the knife switch actuated.

Figure 1:
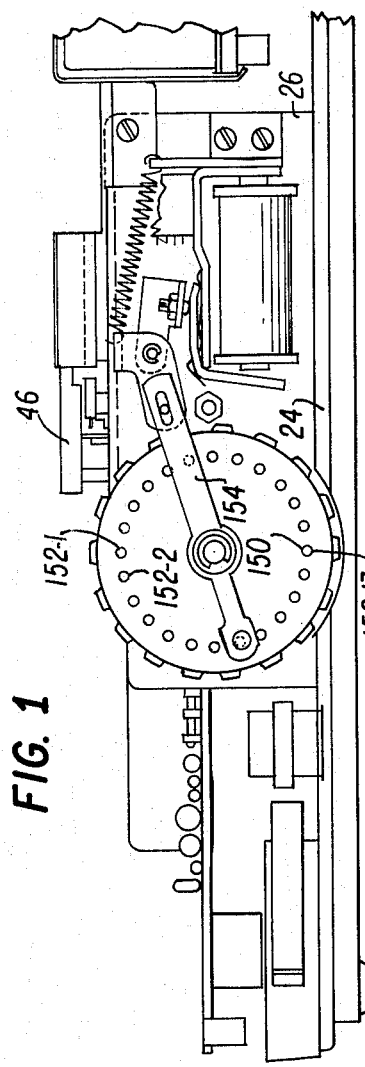
FIGURE 1 is a fragmentary side elevation of an illustrative dictating machine having a tape drive means embodying the present invention.

While the invention is susceptible of various modifications and alternative constructions, illustrative embodiments have been shown in the drawings and will be described below in considerable detail. It should be understood, however, that there is no intention to limit the invention to the specific forms disclosed, but on the contrary, the intention is to cover all modifications, alternative constructions and equivalents falling within the spirit and scope of the invention as expressed in the appended claims.

TAPE DRIVE MECHANISM

Upon more specific reference to the drawings, it will be seen that the invention is there exemplified in an illustrative dictating machine 20 built in the form of a compact, lightweight unit adapted for recording or transcription. For details of the more general constructional features of the machine, reference may be made to the copending application of Marcel Jules Helene Staar, Serial No. 181,543, filed March 22, 1962, entitled Dictating Machine Drive Mechanism, now Patent No. 3,124,360. In general, such machine comprises a housing or casing having a flat base 24 (FIGS. 1 and 2) on which the components of the machine are mounted by means including spaced brackets 26 between which a roll 28 of relatively wide tape 30 is rotationally mounted. The tape on the roll is carried on a spindle 32 on which the tape 30 is tightly wound and the end 33 of the spindle is rotationally carried in notches 34 in the brackets 26. The tape is shown in FIG. 2 led from the roll 28 onto a flat surface 40 presented by a transversely extending fixed frame member 42 which is supported on the base plate 24 of the casing and therefrom onto a surface 43 provided by the housing. The tape 30 is guided past the recording head 44, as shown in FIG. 10, while being intermittently advanced during the recording or transcription process by the tape drive mechanism which includes sprockets 45 engaged in perforations 46 adjacent the margins of the tape.

A pivotally mounted bar 47 (FIGS. 1 and 2) extends transversely across the machine above the tape and provides support for a transversely movable knife 48 (shown in lowered position in FIG. 2) which is manually operable to server dictating bearing lengths of tape from the roll. To facilitate positioning the end of the tape 30 under the bar 46, the latter is pivotally mounted so that it may be raised to an upward position. The tape 30 is advanced under the bar and along the flat surfaces 40, 43 presented by the frame of the machine and the housing past the transversely reciprocated recording and playback head 44 which, as shown in FIG. 10, is located directly under and in contact with the tape for recording purposes. Referring to FIG. 2, the bar 46 includes a pressure plate 50 which is resiliently urged downward by means herein shown as springs 52 and has a soft undersurface 54 bearing directly against the tape and holding it against the surfaces 40, 43 and in engagement with the sprockets 45. As herein shown, the tape 30 is in the form of a magnetizable layer on a backing or support of plastic film or like material, having evenly spaced perforations 46 in the margins of the tape.

As illustrated diagrammatically in FIG. 10, the recording and playback head 44 is supported on a pivotally mounted arm 56 which is reciprocated transversely by a drive mechanism indicated by the general reference numeral 58. According to one of the feature of the present invention, the drive for the tape comprises a stepping motor 60 adapted to advance the tape 30 in even increments of movement connected through suitable gearing 62 to a shaft 64 carrying the sprockets 45 engaged in the perforations 46 of the tape. Synchronism between the reciprocatory movement of the recording head 44 and the intermittent advance of the tape 30, is obtained by means of the control which is shown in diagrammatic form in FIG. 10, thereby producing a recording on the tape in the form (FIG. 3) of transverse arcuate traces T longitudinally spaced by the distance of each step of advance of the tape.

A separate microphone 66, shown diagrammatically in FIG. 10, is connected by cable to the dictating machine and includes hand-operated push buttons 68, 70, 72 or the like for controlling the operation of the machine. A microphone 66, with hand-operated controls, as shown diagrammatically in FIG. 10, provides means for controlling the operation of the machine for recording and playback immediately of the recorded information or dictation. Thus the dictating machine is actuated to "record" by means such as a button which may be shifted to "Record" position which will start the recording process. The drive 58 for the recording head 44 will be actuated responsive thereto to reciprocate the head and the tape 30 will be advanced step by step in synchronism with the head 44. The tape 30 may be stopped by shifting the button 68 from its "Record" position and restarted at the option of the dictator. Such control on the microphone may provide for backspacing as well as for advancing the tape. In the present instance this is achieved by shifting the button 72 to its "Reverse" position, and the controls for operating the drive mechanism to cause the tape to be moved and backspaced will be described more completely later.

It will also be understood that the machine may be set up for transcribing a piece of dictation previously recorded on a length of magnetic tape. It will be noted that with the record in the form of a short length of tape, the tape may be laid on the upper housing section to extend under the pivotal bar 47 which extends transversely across the machine. One of the major features of the machine is the provision of means including the knife 48 supported by the bar 47 for movement across the tape, for severing the tape after a piece of dictation has been completed so as to separate a dictation-bearing length of tape from the roll and to provide the record thereof in the form of a short length of tape. In this way, the record may be easily handled either to be transcribed, filed, or mailed in the usual mailing envelope. To facilitate handling the relatively short piece of tape, means are provided to accurately align and guide the end of the tape in position past the sprockets and over the recording head. It will be understood that in keeping with usual practice, the operator transcribing with use of the machine may employ a headpiece, including earphone, and for listening to the record may employ foot operated controls for advancing and backspacing the tape during the transcription process. It is contemplated that the same machine will be used for both dictation and transcription, separate means being provided for connecting the transcription controls to the machine.

Turning now to the means for support and drive for the recording and playback head 44, which is described in greater detail in the copending application before referred to, the drive is shown diagrammatically in FIG. 10. Adjacent the outer or free end of the arm 56 is mounted a rotary drive roller 74. The drive roller 74 is supported on a vertical axis by means of a shaft having a pinion 76 at the upper end of the shaft which is in mesh with a worm gear 78 carried by a shaft powered by a motor 80 or suitable other power source on the arm 56. Electrical power is supplied to the motor 80 from a power supply, so that the drive roller 74 is continuously operated by the motor when the machine is being used for recording or transcribing dictation.

The reciprocatory drive mechanism for the head also includes a slidable plate 82 which is carried flat on the base 24 of the housing and is provided with an arcuate slot 84 in which the drive roller is received. The plate 82 is movable in a direction axially of the tape, and is restrained against transverse movement by means such as guides 85 on the sides of the plate, to position to one wall of the slot 84–1 or the other wall of the slot 84–2 in engagement with the drive roller 74 such that upon continuous rotation of the drive roller by the motor 80 a reaction force is set up tending to move the pivotal arm 54 in one direction or the other. The drive roller 74 is shown in FIG. 10 in a neutral position free from engagement with either wall of the slot. By moving the slidable plate 82 upwardly in FIG. 10 to engage the drive roller with the lower edge of the slot 84–1, upon normal counterclockwise rotation of the drive roller, the arm 56 and head 44 carried thereby will be pivoted from right to left as viewed in this figure. By moving the plate 82 downwardly to position the drive roller in engagement with the upper wall of the slot 84–2, with the drive roller 74 operating counterclockwise, the arm and head will be driven from left to right.

For positioning the plate 82 to engage one wall or the other wall of the slot with the drive roller 74, means are provided, shown diagrammatically in FIG. 10 as a pair of drive solenoids DS1, DS2, arranged normal to a pivotally mounted connecting lever 88 which transmits the motion of the solenoids to the slidable plate. In the present case, the connecting lever 88 is pivotally supported on a pin 90 fixed to the base plate 24. Lost motion connection is provided between the lever and the slidable plate by means of an elongated slot 92 in the lever and a pin 94 fixed to the plate. The solenoids for actuation of the slidable plate each include armatures DS1–A, DS2–A which are pivotally mounted such that when one of the solenoids is energized to pick up its armature, the latter pivots about an intermediate point of support, the pivotal motion of the armature being transmitted by an arm DS1–AA, DS2–AA extending from the armature to the connecting lever. For this purpose the end of the connecting lever 88 adjacent the solenoids DS1, DS2 has a pin 96 which fits between the arms carried by the solenoid armatures. It is contemplated that one or the other of the solenoids will be energized to shift the plate between alternate positions of engagement.

The two drive solenoids DS1, DS2 which control the plate position and thus form components of the reciprocatory drive mechanism, are shown in the diagrammatic view of FIG. 10 in positions corresponding to the positions which they actually occupy in the dictating machine housing. Referring to this figure, it will be seen that the solenoids DS1, DS2 connected to a source of supply indicated conventionally as B+ via the conductor 98 and the normally closed contacts RR–1 of the reverse relay RR, when either the "Record" or "Playback" switch of the microphone or like control instrumentalily is closed. The circuit is completed through one of the solenoids DS1, DS2 by means of alternately operated drive switches DSW1, DSW2 which are connected in series with the solenoids and the return side of the circuit herein shown conventionally as B–. As will be evident from FIG. 10, such switches DSW1, DSW2 are alternately operated by a drive cam 100 on the sprocket shaft 102. The cam 100 operates the switches via an actuator and is fully reversible. It will be noted that with the circuit energized, and the microphone switch on either the "Record" or "Playback" position, the plate 82 will be shifted to a position corresponding to a position of the sprocket shaft and thus the tape.

Accordingly, with one of the drive solenoids DS1 or DS2 of the reciprocatory drive mechanism energized, the recording and playback head 44 will be driven in one direction or the other across the tape, and such movement will continue until the trace is completed. Responsive to the completion of each trace, the other solenoid DS1 or DS2 will be energized to shift the plate 82 and reverse the direction of motion of the head.

For the purpose of alternately operating the drive solenoids DS1 or DS2 for the reciprocatory drive mechanism responsive to the completion of each trace of the head, referring to FIG. 10, the arm 56 carries adjacent the outer end of the arm a pair of electrically energized switch contacts 104. The contacts at the end of the arm 56 are energized, as will be apparent from FIG. 10, via the conductor 106 which energizes the arm, upon closing either of the switch buttons on the microphone labelled "Record" or "Playback." In the course of the transverse trace of the arm, one of the contacts 104 thereon facing forward in the direction of movement engages a switch member 108, 110 located adjacent the end of the path of the arm to close a circuit. Thus, moving from right to left as viewed in FIG. 10, the contact 104 on the left-hand side of the arm 56 engages the switch member 108 positioned adjacent the left-hand side of the plate. With the contacts 104 on the arm 56 energized, the switch assemblies 108, 110 form a terminal which, as shown in FIG. 10, is connected in the control means to provide a signal responsive to the completion of each trace of the arm. This is achieved in the present instance by connecting the switch assemblies 108, 110 to a pair of latching relays LR1, LR2. By means of the control circuit including the latching relays LR1, LR2, the tape drive and reciprocating drive for the head are synchronized. How this is achieved will be set out more completely later. At this point, it will be noted that in the operation of the unit, with the sprocket shaft 102 positioned as shown in FIG. 10, and the upper drive solenoid DS1 of the reciprocatory drive mechanism connected through the drive switch DSW1 to B—, the picking up of the armature of that solenoid DS1 will move the drive plate 82 upwardly as viewed in FIG. 10 to engage the lower edge of the slot 84–1 with the roller 74. With the roller 74 rotating counterclockwise, this will cause the arm 56 to sweep toward the left. Responsive to the contact 104 at the end of the arm engaging the switch means 108 at the left-hand side of the plate and adjacent the left end of the path of the arm, B+ will be connected thorugh the conductor 112 connected to that switch, to the latching relay LR2 at the upper right-hand portion of FIG. 17. It will be seen that the relay will be energized and held energized for a brief period by means of the condenser 114 across its input terminals, picking up a pair of contacts LR2–2, LR2–3 which connect the B+ and B— via conductors 116, 118 to means herein shown as the stepping motor 60 for the tape drive. This effectively reverses the polarization of the stator of the motor 60. How the reversal of polarity of the energizing current causes operation of the stepping motor, will be considered in more detail in the following section. With the drive cam 100 at the end of the sprocket shaft 102 shifted ahead one step from the position shown, the drive switches associated therewith will be moved to its upper alternate position with DSW1 closed, thereby deenergizing the first drive solenoid DS1 and energizing the other solenoid DS2 thereby causing the plate 82 to be shifted in position to engage the upper edge 84–2 of the slot 84 with the drive roller 74, thereby reversing the direction of motion of the arm 56 so that it moves to the right as in FIG. 10. At the completion of the trace to the right, the switch 110 is energized to actuate the latching relay LR1, again reversing the polarity of current supplied over the conductors 116, 118 to the stepping motor 60. In this manner the head 44 is reciprocated, and responsive to the completion of each trace the polarity is reversed of the stator poles of the stepping motor 60.

STEPPING MOTOR

Figure 2:
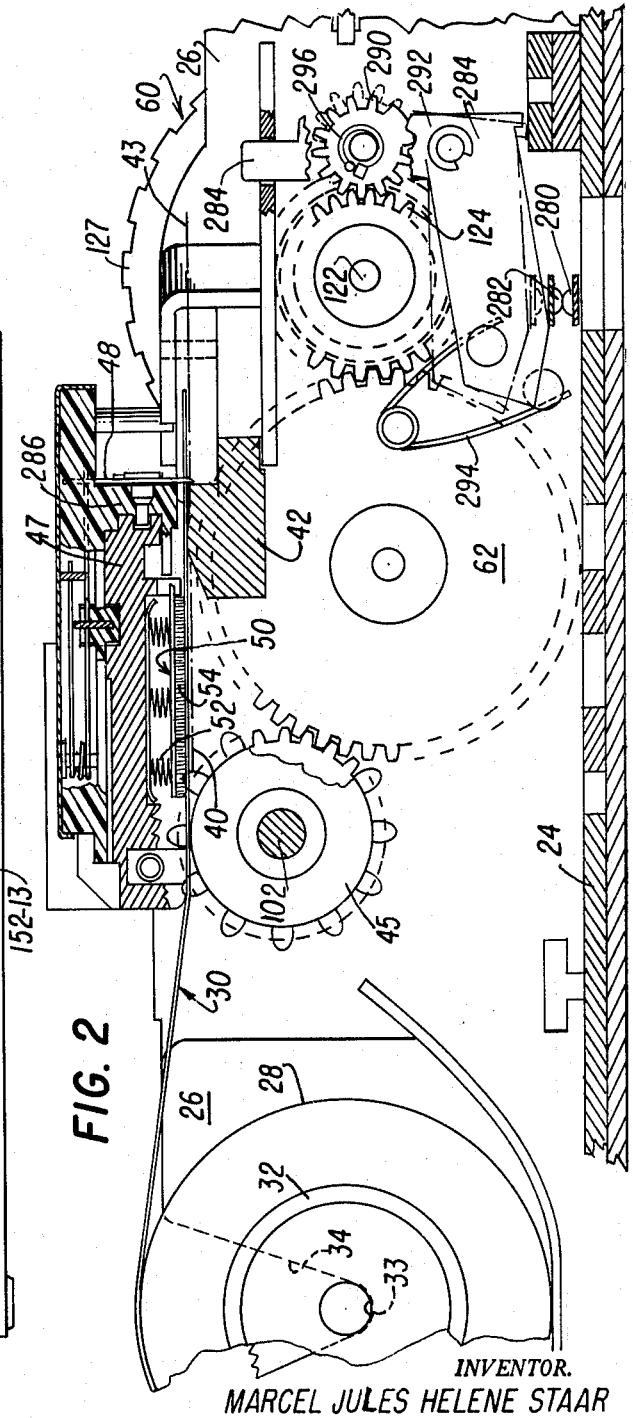
FIG. 2 is an enlarged fragmentary longitudinal section taken looking at the opposite side of the tape drive stepping motor in FIG. 1.
Figure 3:
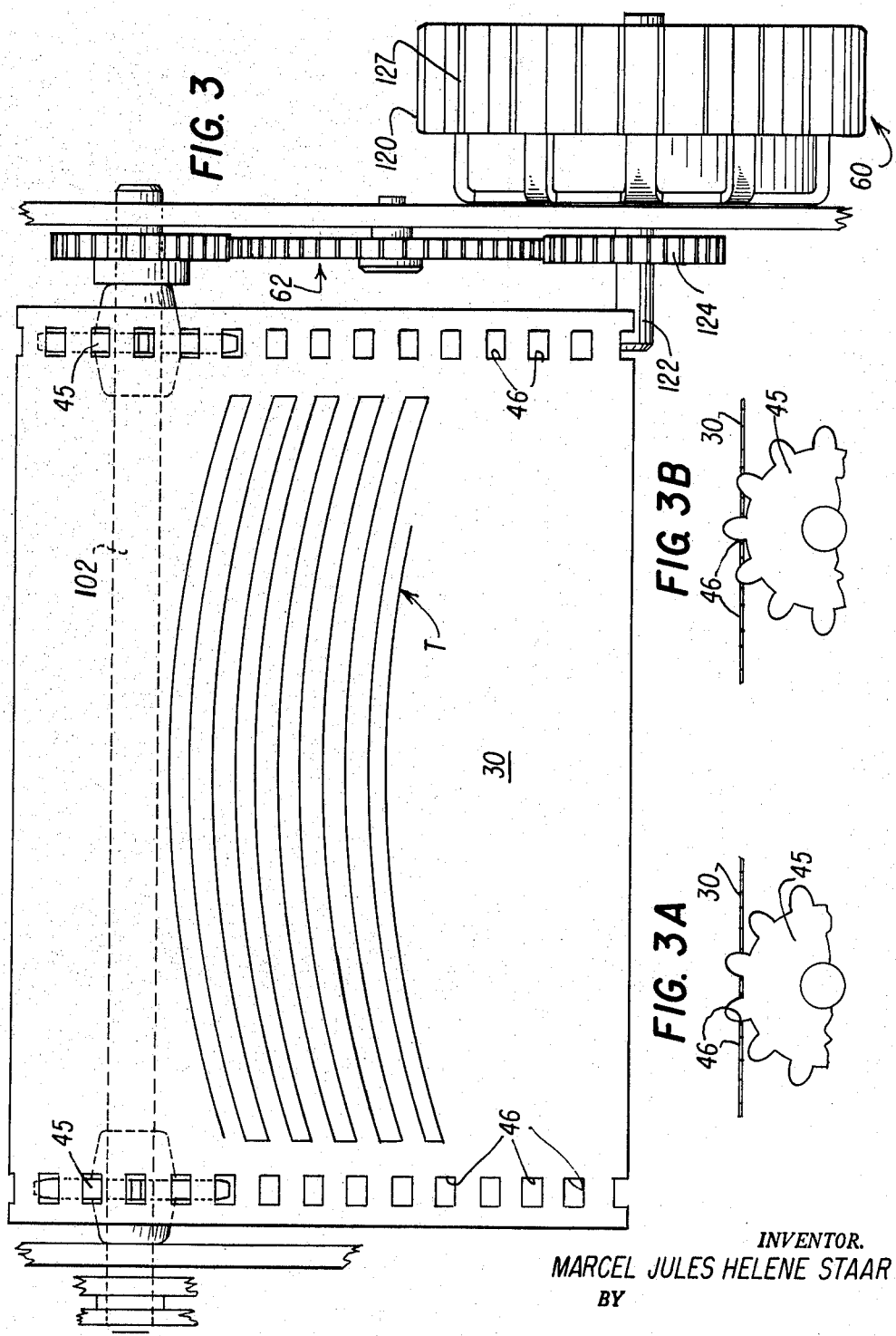
FIG. 3 is an enlarged diagrammatic plan view of the tape drive mechanism.
Figure 4:
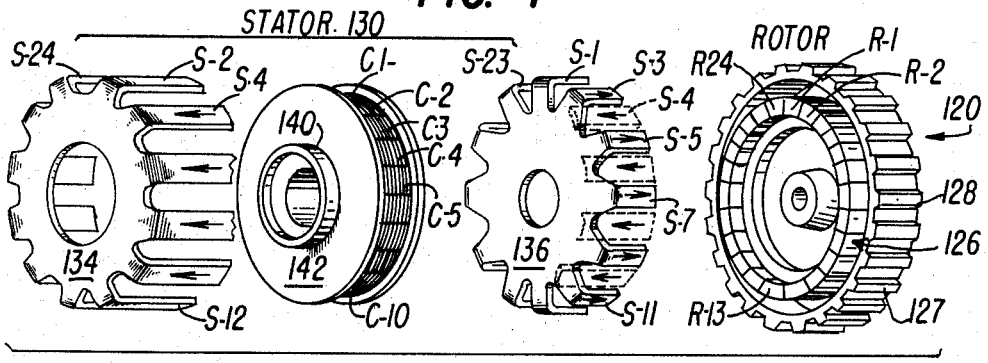
FIG. 4 is an exploded perspective view of the stepping motor device stator and rotor components.
Figure 5:
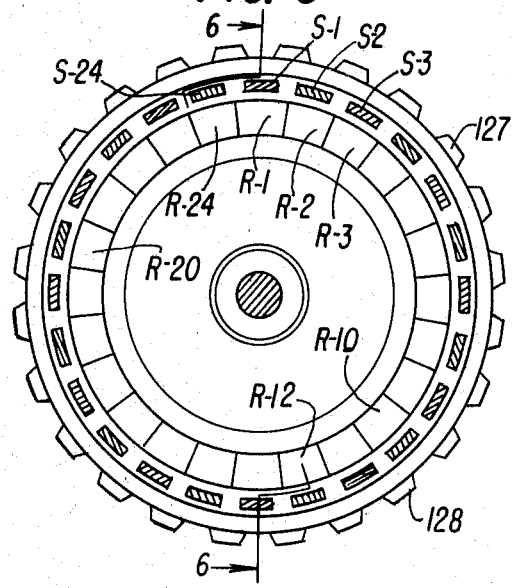
FIG. 5 is a sectional view of the stepping motor device, taken in the plane of lines 5—5 in FIG. 6.
Figure 6:
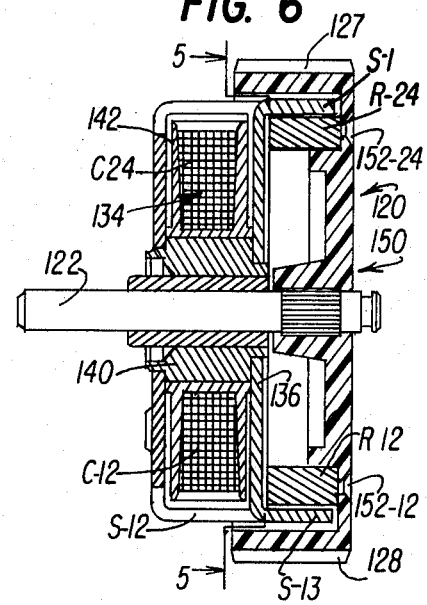
FIG. 6 is a transverse sectional view of the stepping motor device with the components shown in FIG. 4 assembled.

According to one of the major features of the present invention, the tape drive mechanism is operated by a stepping motor device 60 which, as shown in FIGS. 2 and 3 is connected to sprockets 45 which are engaged in the perforations 46 in the tape by a gear train 62 carried on the frame of the machine. Referring particularly to FIGS. 4–6, this stepping motor device 60 comprises a rotor 120 which is supported on a horizontal shaft 122 carried on the frame of the machine. The shaft 122 carries a drive gear 124 (FIG. 2) fixed thereto of the gear train 62 conveying motion of the rotor 120 to the sprocket shaft 64. Referring again to FIGS. 4–6, the rotor includes an annular ring made of permanently magnetized segments 126 labeled R–1 to R–24. These segments are polarized such that adjacent segments (R–1 and R–2, for example) have the opposite polarity. The ring of rotor segments is fixed to a hand wheel 127 made of non-magnetizable material, such as plastic, which has an outer rim 128 spaced outwardly of the ring of segments 126 forming the rotor. The outer rim 128 of the wheel 127 projects above the upper surface of the dictating machine housing (FIG. 2) and is accessible for manual operation to rotate the sprocket shaft 64 directly, having a corrugated or knurled outer surface to facilitate such manual operation.

The stator 130 of the stepping motor (FIG. 4) includes a plurality of circumferentially spaced, relatively narrow pole pieces 132 carried in an annular ring outside of the ring of rotor segments 126, one stator pole piece for each rotor segment. These pole pieces, labeled S–1 to S–24 in FIG. 5, are formed as parallel bars or teeth extending from a pair of axially spaced plates 134, 136 parallel to the axis of the stepping motor shaft 122 and evenly spaced about the ring of rotor segments. As shown in FIG. 4, the bars or teeth S–1 to S–24 forming the stator pole pieces 132 are arranged so that every other tooth is carried by the same plate 134 or 136 so that the teeth from one plate are interposed between the teeth carried by the companion plate. In the present case, the number of teeth 132 and thus poles of the stator corresponds to the number of permanent magnet segments 126 of the rotor. Referring to FIG. 4, the even numbered bars S–2 to S–24 are carried by the plate 134 while the odd numbered bars S–1 to S–23 are carried by the plate 136. The even numbered bars are longer so that, with the spacing of the plates 134, 136, the bars 132 extend for the same axial distance adjacent the rotor segments 126.

Each stator pole piece S–1 to S–24 is part of a magnetic circuit including a stator coil C–1 to C–24. The coils are wound so that every other stator tooth or pole piece has the same polarity and the interposed tooth or pole piece has the opposite polarity, as indicated by the arrows in FIG. 4. The flux paths of the magnetic fields set up in the even numbered teeth S–2 to S–24 and plate 134 carrying said teeth upon energization of the even numbered stator coils C–2 to C–24, will extend in the same direction, and similarly the flux paths of the magnetic fields set up in the odd numbered teeth S–1 to S–23 and the plate 136 carrying said teeth, will extend in the same direction to provide greater field strength in the stator pole pieces. To this end the plates 134, 136 carrying the bars 132 are axially spaced on a hub 140 of non-magnetic material to insulate the plates from each other, and the teeth are fixed to maintain predetermined gaps or spaces therebetween. The coils C–1 to C–24 are wound on a spool 142 which is fixed on the hub 140.

Accordingly, it will be seen that for any polarization of the stator poles S–1 to S–24 the rotor will have positions in which the permanent magnet rotor segments R–1 to R-24 are located adjacent pole pieces of the stator having opposite polarity. Upon reversal of polarization of the stator poles, the rotor will be placed in an unstable condition since adjacent poles of the stator and segments of the rotor will have the same polarity, tending to urge the rotor circumferentially in both directions. The instability will result in the rotor turning in whatever direction it is initially started, by one step, to its new position.

*Preference means*

According to one of the important features of the present invention, means are provided to mechanically produce a preference urging the rotor 120 of the stepping motor 60 in one direction or the other. Means are provided for urging the rotor in either the forward-advance direction or in the reverse-back space direction. For this purpose, referring to FIGS. 1, 6 and 7–9, the outer face 150 of the hand wheel 127 of the stepping motor 60 includes a circle of evenly spaced wells or openings 152–1 to 152–24, one for each rotor segment 126 and, thus, rotor position. Mounted across this face of the stepping motor wheel 127 is a preference arm 154 carrying a ball 156 adjacent its outer end seating in one of the wells or openings 152–1 to 152–24 in the face of the stepping motor wheel. As shown in FIGS. 7 and 8 the arm 154 is pivotally mounted on the stepping motor shaft 122 so that it may be pivoted slightly clockwise from the position shown in FIG. 7 to the position shown in FIG. 8, being resiliently held in the position shown in FIG. 7 by a tension spring 157. In this position of the preference arm 154 the ball 156 is supported by the arm on the lower edge 158 of the opening 152–8 just under the ball in the face of the stepping motor wheel such that the ball, which is being resiliently held against the side of the wheel, acts on the lower edge thereby offsetting the rotor by the angle $\alpha$ and tending to urge the wheel in the counterclockwise direction. With this preference means active in the manner shown, upon reversal of polarity of the stator poles, the rotor will be given sufficient initial urging for it to advance one step whereupon the ball 156 rides up out of the first opening 152–8 and down into the next opening 152–7.

With this same preference means, the stepping motor 60 may be controlled to step in the reverse direction. This is achieved by pivoting the preference arm 154 and ball 156 as shown in FIG. 8 clockwise to move the ball to the opposite side 160 of the opening or well 152–8 beneath the ball and bear against that side, thereby offsetting the rotor 120 by the angle $\alpha$, and tending to urge the wheel of the stepping motor in a clockwise direction. Via the gear means to the sprocket shaft 64 of the tape drive mechanism, counterclockwise rotation of the stepping motor as viewed in FIG. 8 produces advance motion of the tape and clockwise rotation of the stepping motor produces back spacing.

The position of the arm 154 which imparts the preference to the rotor 120 of the stepping motor 60 to rotate in one direction or the other, is under the control of a reverse solenoid RS which appears in FIGS. 1, 7 and 8 and which also appears in the diagrammatic illustration of FIG. 10. Referring first to FIG. 8, the end of the preference arm 154 adjacent the solenoid RS is connected to be operated by the solenoid armature RSA. A pivotal lever 162 is included in this connection. The solenoid armature RSA is a right-angle member, pivotally mounted at the corner of the member such that when the armature is drawn up by the energization of the solenoid, as shown in FIG. 8, the right-angle portion thereof 164 is moved upward to engage a set screw 166 on the pivotal lever 162, pivoting the latter counterclockwise about its pivot 164 and causing clockwise rotation of the preference arm 154. The preference arm 154 is connected with a lost motion pin and slot connection 168 to the lever 162.

Now referring to FIG. 10, the arrangement is shown diagrammatically in this figure, including the reversing solenoid RS which, with the reversing switch 72 on the microphone 66 closed, is energized to pick up its armature RSA and thereby rotate the preference arm 154 in a clockwise direction. This will tend to rotate the stepping motor in a clockwise direction to back space the tape.

ALTERNATIVE PREFERENCE MEANS EMBODIMENT

Referring to FIGS. 11 and 12, according to a further feature of the invention preference means is provided engaging the rim of the stepping motor rotor 120 to offset the rotor by an angle $\alpha$ or $\alpha_1$ to produce rotation in a desired direction.

For this purpose, a preference arm 200 is mounted on the frame of the machine to engage the ridged outer surface 202 of the rotor 120. As herein shown, the said outer surface has circumferentially spaced projections 204 each having inclined forward and trailing edges 206, 208. The preference arm carries a roller 210 contacting the outer surface 202 of the rotor at the edge of one of such projections thereby imparting a rotational force to the rotor 120 offsetting it by the angle $\alpha$ or $\alpha_1$. As shown in FIG. 11, the reverse solenoid RS is energized by closing the reverse switch 72', thereby drawing up its armature RSA which, via the bent lever 212 and connecting lever 214, tends to pivot the preference downward to the position shown in FIG. 11, wherein the roller 210 engages the trailing side 206 of a projection 204 causing the rotor to be offset by the angle $\alpha_1$ in the reverse direction. Upon reversing stator polarity, the rotor 120 will be moved one step in the "Reverse" direction.

Referring now to FIG. 12, the preference arm 200 is positioned to cause the rotor 120 to advance rather than backspace the tape. To this end the reverse switch 72' is open and the reverse solenoid is de-energized, allowing the tension spring 214 to raise the preference arm 200 such as to move the roller 210 carried thereby into engagement with the forward edge 208 of the projection 206, offsetting the rotor 120 by the angle $\alpha$ in the direction which will cause the rotor 120 to rotate in the advance direction.

CONTROLS FOR CONTINUOUS MOTION

Consideration will now be given to a further important feature of the invention, whereby the stepping motor 60 may be caused to intermittently move in rapid step-by-step fashion in either direction. In the normal operation of the dictating machine to record dictation, the stepping motor 60 is operated responsive to the completion of each trace of the recording and playback head 44 to advance the tape a precise distance, as herein shown, one-half of the distance between center lines of adjacent perforations. For this purpose the latching relays LR1 and LR2 are alternately operated upon the alternate energization of the switch means 108, 110 by the contacts 104 carried by the reciprocating arm 56 supporting the recording and playback head 44. To cause the stepping motor to operate it is only necessary to energize the stator coils C–1 to C–24 for a short interval sufficient to reverse the polarity of the stator pole pieces S–1 to S–24 and thereby create the instability of the rotor due to the similar polarization of the rotor segments R–1 to R–24. The rotor 120 will rotate in the direction dictated by the mechanical preference means. Continued energization of the stepping motor stator is not necessary since the permanent magnet rotor segments R–1 to R–24 link the adjacent pole pieces S–1 to S–24 with the flux of the permanent magnet fields thereby resiliently maintaining and interlocking the stator and rotor in circumferential position with the stator pieces in alignment with the rotor segments but for the slight circumferential movement produced by the preference means.

It will be noted that a single step of the rotor 120 of the stepping motor 60, in either direction, produces motion of the tape drive sprocket shaft 102 and corresponding motion of the drive cam 100 and change in state of the drive switches DSW1, DSW2 for the drive solenoids DS1 and DS2. Also on the sprocket shaft 102 is the continuous motion cam 240 which is similarly moved upon step movement of the rotor 120. The continuous motion cam 240 controls, via an actuator 242, a pair of continuous motion switches CSW1 and CSW2 which are energized over a common conductor 244 leading to a source of positive potential, herein shown as B+, through the "Reverse" switch 72 on the microphone. The common conductor 244 is also energized from a source of positive potential upon the closing of a knife switch 246, which is shown at the right-hand side of FIG. 10 and also shown in FIG. 2. The control means including the "Reverse" switch 72 and the continuous motion switches DSW1 and DSW2 provide means for rapid step-by-step movement of the stepping motor in the reverse direction to backspace the tape. This provision enables backspacing the tape 30 to a previously recorded section of dictation in rapid-fire manner, and upon release of the "Reverse" button 72 and actuating either the "Record" button 68 or the "Playback" button 70, the step-by-step advance motion of the stepping motor 60 will resume, synchronized with the reciprocation of the recording and playback head 44. This synchronization is achieved by means including the drive cam 100 on the sprocket shaft and associated drive switches DSW1 and DSW2 which automatically produce a direction of movement of the recording and playback head 44 dependent upon tape position, such that a new recording may be made directly over the old trace T or the old trace may be played back, and the head 44 will be moved in the same direction as it was moved when the trace was originally made.

The continuous motion switches CSW1 and CSW2 are connected to the conductors 112 and 250 leading to the latching relays LR2 and LR1, respectively. With the common conductor 244 energized by means of either the "Reverse" switch 72 or the knife switch 246, one or the other of the latching relays LR1 or LR2 will be energized via the continuous motion switches CSW1 and CSW2. It will be noted that in the position shown in FIG. 10, the first switch CSW1 is closed thereby energizing the first latching relay LR1 over the conductor 250, which will shift the direction of polarization of the stepping motor stator poles S-1 to S-24, causing the rotor 120 to move one step. The direction of rotation will be dependent upon the state of the reverse solenoid RS, and assuming actuation thereof responsive to the closing of the "Reverse" switch 72, the rotor 120 will step in the reverse direction. Such motion of the rotor will cause the sprocket shaft 102 to move one step shifting the continuous motion cam 240 one step, changing the state of the continuous motion switches CSW1, CSW2, deactuating the first and actuating the second one of the latter. Responsive thereto the second latching relay LR2 will be energized, shifting the polarization of the stepping motor stator poles S-1 to S-24, causing the rotor to step in the reverse direction. This rapid intermittent stepping will continue for so long as the "Reverse" switch 72 remains actuated.

As an additional feature of the invention, means are provided to advance the stepping motor 60 a predetermined number of steps, in rapid step-by-step fashion as an incident to cocking the knife 48 prior to slicing off short lengths of tape, so as to advance the tape before cutting thereby providing a margin between the end of the tape and the last recording trace T. For this purpose, the stepping motor 60 is controlled to operate in a continuous step-by-step manner by means herein shown to include the knife switch 246. As above noted, upon closing the knife switch 246, the continuous motion switches CSW1 and CSW2 are electrically energized over the conductor 244. The knife switch 246, as shown in FIG. 2, comprises a pair of flexible members yieldingly supporting contacts 280, 282. A bent lever 284, is pivotable counterclockwise about its pivot 286 to engage the flexible members, as shown in FIG. 2, and thereby close the contacts 280, 282 responsive to manual cocking of the knife 48. To this end, the knife 48 is supported on a member 286 slidably carried on the knife bar 47 and movable manually lengthwise of the bar to move the knife into cocked position at one side of the tape and, as an incident to completing this movement, to pivot the knife from a raised position above the tape to a lowered position (FIG. 2) for slicing through the tape. Depending below the slidable knife supporting member 286 is a pin which engages in an actuating member 288 linked to the upper end of the knife lever 284 for camming it forwardly to close the knife switch.

Responsive to such closing of the knife switch contacts 280, 282, continuous step-by-step motion of the stepping motor 60 will be produced due to the energization of the continuous motion switches CSW1 and CSW2. Since the reverse solenoid RS is deenergized, the stepping motor 60 will operate in the tape advance direction. After a predetermined number of steps, the knife switch is opened by means herein shown as a release gear 290. The latter is carried by the knife lever 284 and upon switch closing movement of the lever is brought into mesh with the drive gear 124 on the shaft of the stepping motor. To cause release of the switch 246, the release gear 290 includes a continuous, non-toothed section 292 which is brought into engagement with the teeth of the drive gear 124 after a number of steps of advance of the drive gear upon continuous step-by-step motion of the stepping motor. Responsive to such engagement by the non-toothed section 292 of the release gear, the knife lever 284 is forced away from the drive gear far enough to move the spring 294 over center, the said spring 294 completing the pivotal motion of the knife lever to its "off" position, as shown in phantom in FIG. 2. A torsion spring 296 fixed at one end and connected to the release gear 290 to be stressed upon counterclockwise rotation of the latter by the drive gear 124, serves as means to return the release gear clockwise to a start position from which it may be rotated to count out the desired number of advance steps of the stepping motor before release after knife actuation. It will be noted that by having a different size release gear or one with a different number of teeth, means are provided for readily preselecting the number of steps of the stepping motor which will be taken.

Referring to FIG. 12, a similar knife switch and release means therefor is shown including a release gear 290. Closing the knife switch in the arrangement depicted causes the terminals 296 and 298 of the continuous motion switches CSW1 and CSW2 to be continuously energized, thereby causing the state of polarization of the stator pole pieces S-1 to S-24 to be shifted responsive to each successive step of the stepping motor. The latter is achieved through the continuous motion cam C and switches associated therewith, in a manner similar to that described in connection with FIG. 10.

SUMMARY OF OPERATION

While it is believed that the operation of the dictating machine described herein, and particularly the tape drive mechanism and stepping motor thereof, will be clear from the foregoing, the operation will be briefly summarized.

From FIGS. 3, 3A and 3B it will be seen that the distance from center line to center line of adjacent perforations in the tape is an even multiple of the longitudinal spacing between adjacent transverse traces. As therein shown, the tape is advanced one-half of the distance between the center lines of adjacent perforations 46 each step of the intermittent drive and, hence, of the stepping motor 60. This is represented by FIGS. 3A and 3B which show the same sprocket 45 at one side of the tape in successive positions. With this arrangement, each trace from left to right, as viewed in FIG. 3, begins substantially on the center line of a perforation, and each trace from right to left begins substantially intermediate the perforations. It will be noted that with this arrangement the direction of motion of the head is dependent upon the position of the tape 30. The position of the tape, in turn, is dependent upon the angular position of the sprocket shaft and the position of the sprockets. Thus, when a short length of tape is placed on the machine for transcribing, the length of tape is automatically positioned so that the recording head, when the drive is started, will be travelling in the same direction as the head travelled when the trace was originally recorded. Similarly, the drive mechanism for the tape and the direction of motion of the recording head are synchronized during the recording process so that if the tape is backspaced or moved ahead to shift between previously and presently recorded pieces of dictation, the head will always be travelling in the same direction when the tape is stopped as it travelled when the trace was originally recorded. How the direction of motion of the recording head is made dependent upon tape position and sprocket shaft position, will be more readily apparent from FIG. 10. The drive cam 100 which is carried on the end of the sprocket shaft 102, is shown in position with the actuator for the drive switches DSW1 and DSW2 riding on a high point of the cam and thus closing the switch DSW1. The drive solenoid DS1 is thereby energized. It will be noted that the high and low points on the periphery of the drive cam 100 correspond to successive positions of the tape, and the total number of such cam and tape positions per revolution of the drive cam 100 agrees with the number of rotor segments 126 and stator pole pieces S-1 to S-24. One step counterclockwise from the sprocket position as shown, the drive switches actuator will drop into a notch of the cam, thus closing the other drive switch DSW2 and opening the first switch DSW1. This will change the state of the drive solenoids DS1 and DS2. In the position as shown, the drive switch DSW1, which is connected to the B— or the return, connects the said B— to the upper drive solenoid DS1 which, when energized, will draw up its armature and thereby move the drive plate 82 in an upward direction, as viewed in FIG. 10. With the first drive solenoid DS1 energized and the drive plate 82 moved thereby to the upward position, the recording arm and head 44 move to the left. With the drive cam 100 in its other position and the drive switches in their alternate position, after a single step of advance by the stepping motor, the other drive solenoid DS2 will be energized lowering the drive plate and causing the recording head 44 to move to the right.

In addition, means are provided for synchronizing the reciprocatory drive for the head with the tape drive so that the tape is automatically advanced a single step upon the completion of each transverse trace thereby to produce a continuous succession of recording traces in alternate directions longitudinally spaced by the distance of advance of the stepping motor, as shown in FIG. 3. In the present instance, this is achieved by the circuit at the top of FIG. 10 including the latching relays LR1, LR2 and the switch means 108, 110 mounted on the frame of the dictating machine adjacent the ends of the path of the recording head. As shown in FIG. 10, with the recording head moving in either direction from right to left, upon actuation of the switch means 108 at the left end of the path, the switch means connects B+ with which the arm 56 is energized to the right-hand latching relay LR2. Energizing this relay LR2 connects the stepping motor 60 to the power supply thereby causing the stepping motor to advance one step from its prior position.

To cause the stepping motor to operate it is only necessary to energize the stepping motor 56 for a short interval sufficient to reverse the polarity of the stator pole pieces and thereby create the instability of the rotor due to the similar polarization of the rotor segments. The rotor will rotate in the direction dictated by the mechanical preference means of FIGS. 7 and 8.

A single advance step of the stepping motor produces motion of the tape drive and corresponding motion of the drive cam 100 and change in state of the drive switches DSW1, DSW2 for the drive solenoids, thereby reversing the position of the drive plate and producing reversal in direction of motion of the recording head. With the head moving toward the right, therefore, the motion of the arm 56 will continue until the switch contacts carried by the arm engage the switch means 110 at the end of the path of the arm connecting B+ with which the arm is energized, to the left-hand latching relay LR1 via the conductor 240. This relay LR1 is energized to pick up its contacts LR1-2, LR1-3 thereby connecting the power supply to the stepping motor 60 but of the inverse polarity. With the stator pole piece polarities thus changed, the stepping motor will be caused to advance one step, advancing the sprocket drive and thereby the tape one step. Producing a single step of advance of the sprocket shaft shifts the drive cam 100 thereby changing the state of the drive solenoids DS1, DS2, thereby reversing the position of the drive plate and the direction of motion of the recording head.

Further in keeping with the present invention, the stepping motor 60 may be caused to operate in continuous rather than intermittent step-by-step manner, in the reverse direction, upon actuation of the "Reverse" switch 72. Also, the stepping motor is caused to advance a predetermined number of steps responsive to cocking the tape severing knife 48, to advance the tape prior to cut-off and form a margin between the last recording trace and the newly formed end of the tape. For this purpose, the continuous motion cam C, having a number of projections on its periphery equal to the stator and rotor poles of the same polarity, is turned by the rotor 120 each step of the latter by a corresponding angle, resulting in reversal of the state of the continuous motion switches CSW1 and CSW2. Responsive to each such change of state of the continuous motion switches CSW1 and CSW2, the polarity of the supply current to the stator windings C-1 to C-24 is reversed, thereby causing the stepping motor rotor 120 to advance a step. Rapid step-by-step motion is thus achieved until terminated by opening the "Reverse" switch 22 or automatically, after a predetermined number of steps, by the release means associated with the knife switch.

I claim as my invention:

1. In apparatus for sound recording and playback on a relatively wide band of magnetic tape, wherein the recording is in the form of longitudinally spaced transverse traces across the tape, the combination comprising, a stepping motor having a rotor and a fixed stator, means connecting said rotor for intermittently moving the tape, said rotor including a rotatably mounted disk carrying an annular ring of permanent magnet segments with adjacent segments equally spaced and oppositely polarized, said disk having a ring of depressions in the face of said disk with said depressions having the same angular spacing as said segments, selectively operable means for resiliently urging said rotor in either direction of rotation and selectively operable to urge said rotor in a preferred direction, said selectively operable means including a pivotal arm having a projection yieldingly held in a depression in said rotor disk, means resiliently turning said arm about its pivot thereby offsetting said rotor in a preferred direction from a position of equilibrium with the stator, said stator including a fixed ring of magnetizable pole pieces carried concentric with said ring of rotor segments and adjacent the latter, respectively, to provide a position of rotor equilibrium with each rotor segment adjacent a stator pole piece of opposite polarity and with said arm projection in one of said rotor disk depressions, and windings associated with said stator pole pieces for producing electromagnetic fields linking the latter, said windings being constructed so that adjacent stator pole pieces are oppositely polarized, said rotor being stepped the angular distance between stator pole pieces to carry the projection on said arm into the succeeding depression in said rotor disk responsive to reversing the polarity of said stator pole pieces in the direction of rotation preferred by said selectively operable means.

2. In apparatus for sound recording and playback on a relatively wide band of magnetic tape, wherein the recording is in the form of longitudinally spaced transverse traces across the tape, the combination comprising, a stepping motor having a rotor and a fixed stator, means connecting said rotor for intermittently moving the tape, said rotor including a rotatably mounted disk carrying an annular ring of permanent magnet segments with adjacent segments equally spaced and oppositely polarized, said disk having a ring of depressions in the face of said disk with said depressions having the same angular spacing as said segments, selectively operable means for resiliently urging said rotor in either direction of rotation from a position of equilibrium with the stator and selectively operable to urge said rotor in a preferred direction, said selectively operable means including a pivotal arm having a projection yieldingly held in one of said depressions in said rotor disk when said rotor is in said equilibrium position, means resiliently turning said arm about its pivot thereby offsetting said rotor in one direction from position of equilibrium with the stator, selectively operable means acting on said arm opposing said yielding means urging said arm against said rotor thereby offsetting said rotor in the other direction from said position of equilibrium with the stator, said stator including a fixed ring of magnetizable pole pieces having the same spacing as and carried concentric with said ring of rotor segments and adjacent the latter, respectively, in said position of equilibrium of the rotor, and windings associated with said stator pole pieces for producing electromagnetic fields linking the latter, said windings being constructed so that adjacent stator pole pieces are oppositely polarized, said rotor being stepped the angular distance between stator pole pieces to carry the projection on said arm into the succeeding depression in said rotor disk responsive to reversing the polarity of said stator pole pieces in a preferred direction of rotation according to the actuation of said selectively operable means.

3. The combination according to claim 2 wherein said selectively operable means includes a solenoid for actuation thereof.

4. In a stepping motor having a rotor, a rotor shaft, and a fixed stator with polarity reversible poles, said rotor including magnetic segments arranged equally spaced in an annular ring about said shaft with one side of said rotor which is normal to said rotor shaft carrying said segments, and selectively operable preference means for determining the direction of stepping of said rotor, said preference means including a pivotally mounted arm, means on said rotor defining discretely spaced elements each adapted to engage said arm so as to stop said rotor in a position offset from equilibrium with the stator; the spacing of said elements being such that with said arm in a first position the rotor is stopped offset from equilibrium with the stator in one direction an equal distance for all positions of the rotor, and with said arm in a second position the rotor is stopped offset from equilibrium with the stator in the other direction, resilient means effective in either position of said arm yieldingly tending to rotate said rotor in one direction or the other; and means for pivoting said arm between said first and second positions.

5. In a stepping motor having a rotor, a rotor shaft, and a fixed stator with polarity reversible poles, said rotor including magnetic segments arranged equally spaced in an annular ring about said shaft with one side of said rotor which is normal to said rotor shaft carrying said segments, and selectively operable preference means for determining the direction of stepping of said rotor, said preference means including an arm pivotally mounted on said rotor shaft so as to lie parallel to and spaced from said one side of said rotor, means on said one rotor side defining a ring of discretely spaced elements each adapted to engage said arm so as to stop said rotor in a position offset from equilibrium with the stator; the spacing of said elements being such that with said arm in a first position the rotor is stopped offset from equilibrium with the stator in one direction an equal distance for all positions of the rotor, and with said arm in a second position the rotor is stopped offset from equilibrium with the stator in the other direction, resilient means effective in either position of said arm yieldingly tending to rotate said rotor in one direction or the other; and means for pivoting said arm about said rotor shaft between said first and second positions.

References Cited by the Examiner

UNITED STATES PATENTS

| | | | |
|---|---|---|---|
| 258,818 | 5/1882 | Spellier | 310—49 |
| 1,966,897 | 6/1934 | Lofgren | 310—49 |
| 2,428,882 | 10/1947 | Kolff | 310—49 |
| 2,804,555 | 8/1957 | Black et al. | 310—49 |
| 2,808,556 | 10/1957 | Thomas | 310—49 |
| 2,823,324 | 2/1958 | Davis | 310—49 |
| 3,005,118 | 10/1961 | Ranseen | 310—49 |
| 3,089,069 | 5/1963 | Thomas | 318—138 |
| 3,091,728 | 5/1963 | Hogan et al. | 318—138 |
| 3,119,941 | 1/1964 | Guiot | 310—49 |

ORIS L. RADER, *Primary Examiner.*

MILTON O. HIRSHFIELD, *Examiner.*

J. W. GIBBS, S. GORDON, *Assistant Examiners.*